United States Patent [19]
Howlett

[11] Patent Number: 5,537,364
[45] Date of Patent: Jul. 16, 1996

[54] METHOD AND APPARATUS FOR CONDUCTING SEISMIC SURVEYS FROM A SINGLE WELL HAVING BOTH SEISMIC SOURCES AND RECEIVERS DEPLOYED THEREIN

[75] Inventor: Donald L. Howlett, Kingwood, Tex.

[73] Assignee: Texaco, Inc, White Plains, N.Y.

[21] Appl. No.: 396,295

[22] Filed: Feb. 28, 1995

[51] Int. Cl.$^6$ .................................................... G01V 1/40
[52] U.S. Cl. .............................. 367/57; 367/25; 367/911; 181/106; 181/120
[58] Field of Search ................................ 367/25, 57, 911; 181/106, 120; 166/250

[56] References Cited

U.S. PATENT DOCUMENTS

| | | | |
|---|---|---|---|
| 3,126,976 | 3/1964 | Cordell et al. | 367/25 |
| 3,707,848 | 1/1973 | Chelminski | 367/911 |
| 5,092,423 | 3/1992 | Petermann | 181/102 |
| 5,185,503 | 2/1993 | Prerre | 181/102 |
| 5,243,562 | 9/1993 | Laurent et al. | 367/25 |
| 5,285,204 | 2/1994 | Sas-Jaworsky | 367/911 |
| 5,297,631 | 3/1994 | Gipson | 367/25 |

*Primary Examiner*—Nelson Moskowitz
*Attorney, Agent, or Firm*—Kenneth R. Priem; James L. Bailey; William J. Beard

[57] ABSTRACT

Method and apparatus for conducting seismic surveys from a single wellbore utilizing an array of seismic detectors and an seismic source suspended downhole from the detectors on a coiled tubing. Actuation of the airgun both generates a seismic signal penetrating the adjacent lateral geological formations and a plurality of air bubbles pass up the borehole to attenuate tube wave propagation in the borehole fluid.

10 Claims, 3 Drawing Sheets

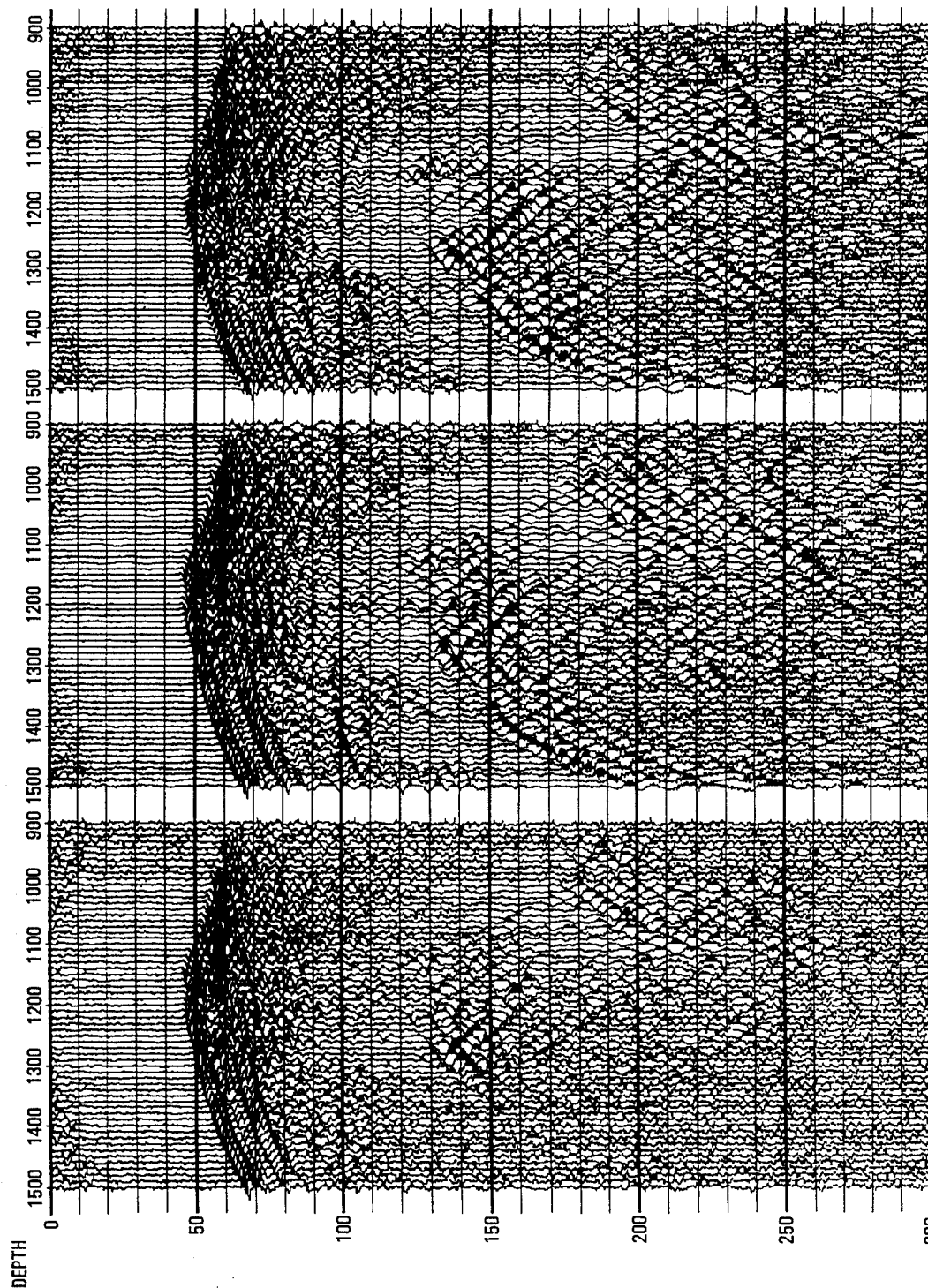

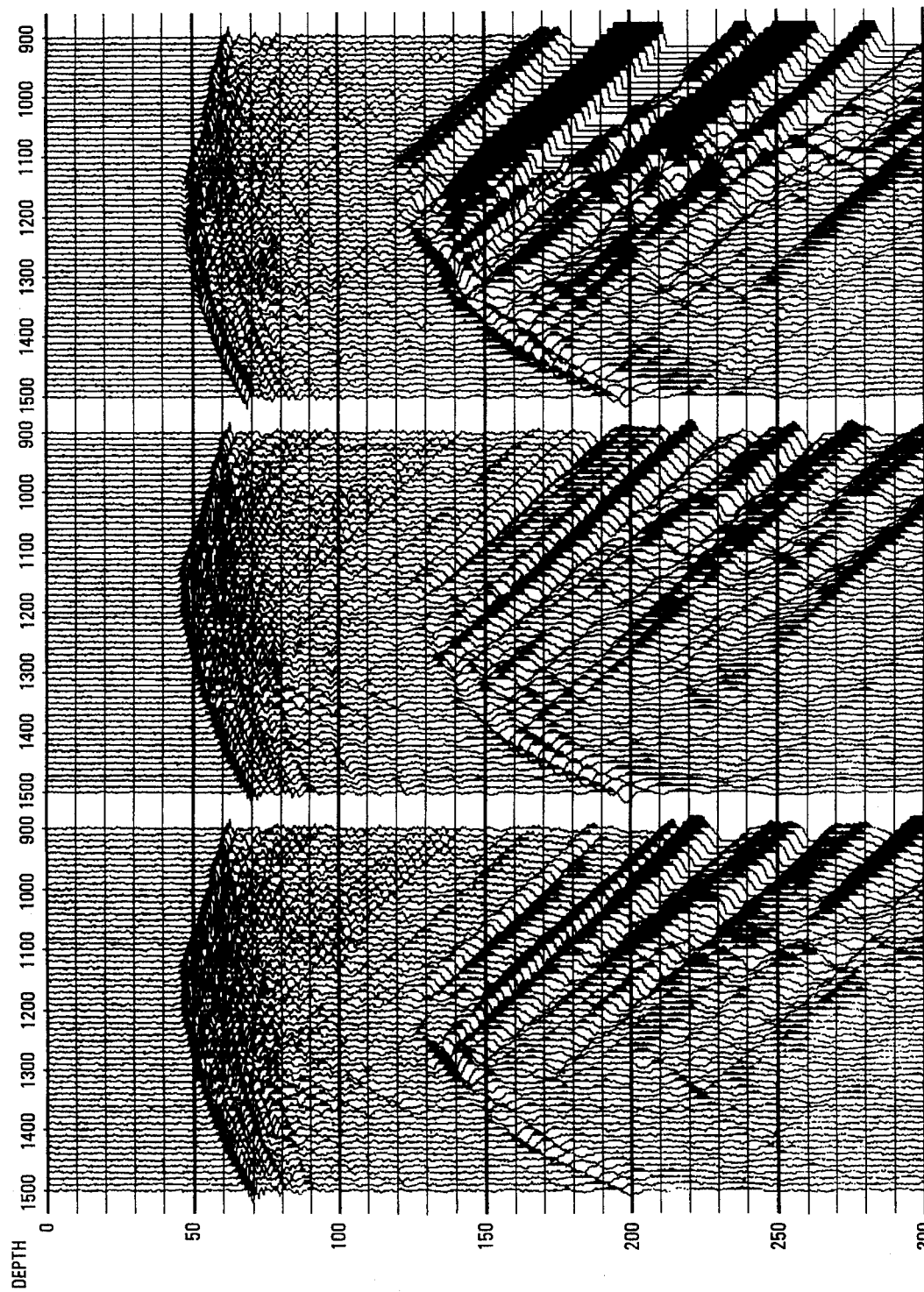

METHOD AND APPARATUS FOR CONDUCTING SEISMIC SURVEYS FROM A SINGLE WELL HAVING BOTH SEISMIC SOURCES AND RECEIVERS DEPLOYED THEREIN

FIELD OF THE INVENTION

The present invention relates to a method and apparatus for conducting seismic surveys from within a single well borehole and in particular for having both a seismic energy source and plural seismic receivers deployed in an array suspended in the wellbore by and inside coiled steel tubing.

BACKGROUND OF THE INVENTION

It is important to map the termination of oil bearing formations as they near a salt dome. Such mapping is very difficult to accomplish using traditional surface seismic techniques. This is primarily because surface generated seismic energy reaching the vertical or near vertical surfaces of an active or passive salt dome or diapir can be reflected or scattered in directions other than back to the surface seismic detectors. Vertical Seismic Profiling surveys, or salt proximity surveys, in which seismic detectors are deployed in a wellbore and in which a seismic source is located on the surface can provide additional information, but not an adequate amount of information because of similar geometrical problems.

It is beneficial to deploy both a seismic energy source and one or more spaced apart seismic detectors in a single wellbore simultaneously. The seismic source/receiver system can be placed in a wellbore drilled near to the vertical or near vertical flank, but outside of, a salt dome. The seismic energy generated by the borehole deployed seismic source can travel along nearly horizontal paths and can be reflected or scattered back from the side or flank of the salt dome or diapir and from the steeply dipping earth formation beds near the flank of such a salt dome. The reflected seismic signals can then be detected from the spaced apart seismic detectors and recorded as a function of time.

SUMMARY OF THE INVENTION

The present invention concerns method and apparatus in which both a seismic source and seismic receivers or detectors, such as hydrophones, three component geophones, or three component accelerometers, are suspended in a single wellbore. To investigate a salt dome or like configuration seismic signals are sent from the suspended source, such as an airgun, and received by the receivers to define a more accurate map of the salt dome flank configuration than possible with surface located seismic sources and detectors. In the present invention an airgun seismic source is suspended at the end of a roll of coiled steel tubing run into the borehole from the surface. A surface compressed air source is connected to the airgun by a smaller diameter steel tubing, run internally to the outer coil steel tubing. An electrical cable is also run internally to the coiled tubing down to the airgun seismic source to effect control of the source. Seismic detectors, such as hydrophones, are connected to the same internally carried electrical cable above the seismic source at a spaced distance therefrom as desired. If preferred, a separate electric cable could be run to the detectors from that used to control the seismic source. If necessary, coolant water can be pumped from the surface down the coiled tubing annulus between the inner tubing and the electrical cable to cool the airgun. The coolant water is allowed to exit the airgun into the wellbore where it circulates back to the surface.

BRIEF DESCRIPTION OF THE DRAWINGS

The invention will now be described, by way of example, with reference to the accompanying drawings in which: FIG. 2 and FIG. 3 are schematics of a seismic section recorded by equipment similar to that deployed in FIG. 1 and illustrates the attenuation of tube waves above the airgun source.

DETAILED DESCRIPTION OF THE PRESENT INVENTION

Figure 1:
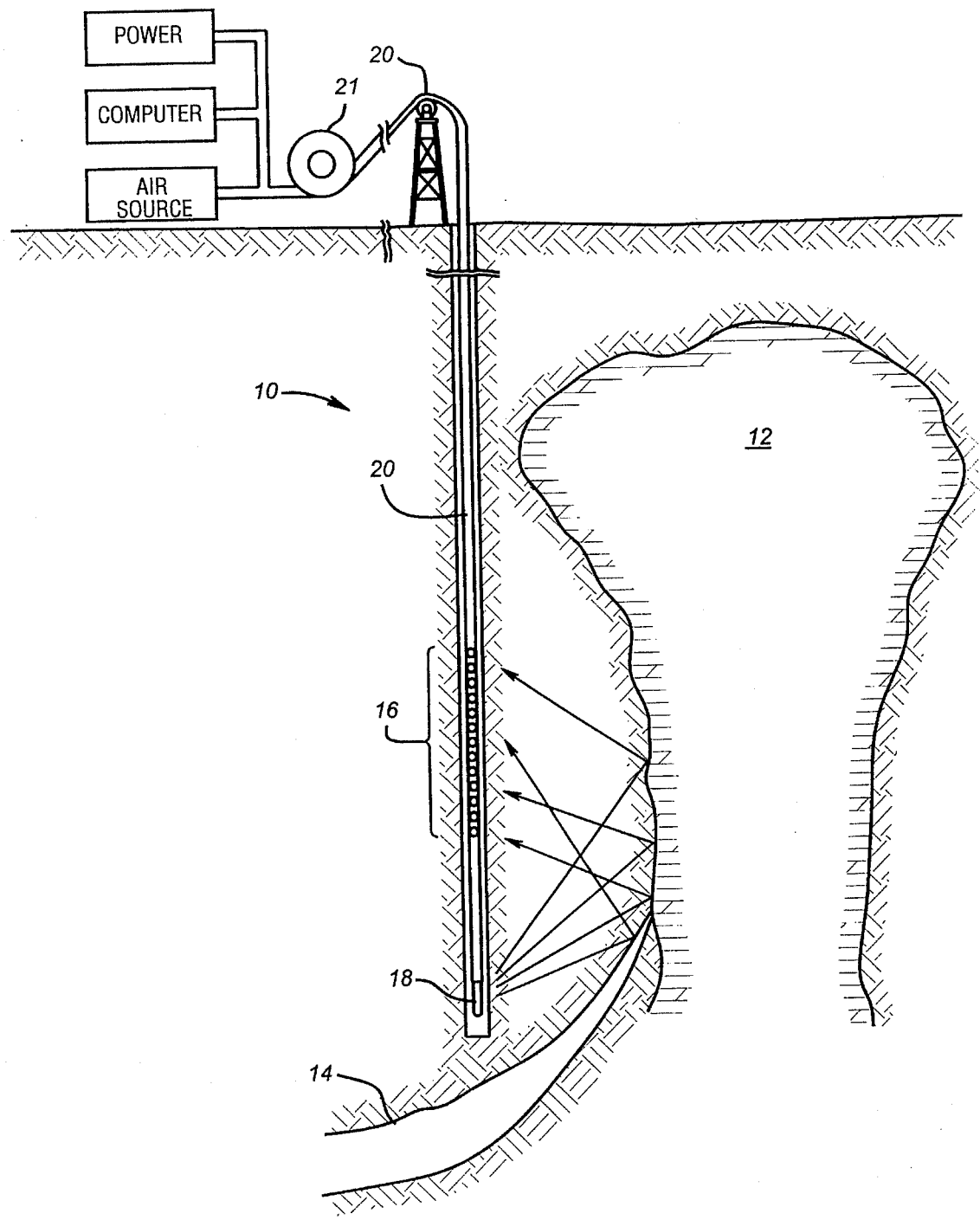
FIG. 1 is a schematic vertical section through a well penetrating geological formations adjacent a salt dome and showing equipment according to the invention deployed by coiled steel tubing in the wellbore.

Referring initially to FIG. 1, a well 10 penetrates a plurality of earth formations adjacent a salt dome or diapir 12 which has an oil bearing formation 14 adjacent thereto. A plurality of seismic detectors 16 are suspended inside coiled steel tubing in the well in a spaced array with a seismic airgun source 18 suspended at the end of the coiled tubing 20 further on down the wellbore from the seismic detectors 16. In operation the seismic airgun energy source 18 generates seismic energy waves which are reflected, refracted and scattered by the surrounding acoustic impedance discontinuities (including the salt dome) and reflected, refracted and scattered back to the seismic detectors 16. Signals from the detectors 16 are sent to a surface computer system for recording. Detectors 16 contemplated for use herein can comprise pressure sensitive hydrophones or geophones or accelerometers attached to an armored electrical cable carried interiorly to the coiled tubing 20. If 3 axis geophones or accelerator meters are used, then some method of determining the orientation of the detectors spatially will be needed. One such method could be the inclusion at the end of the geophone package of an inertial guidance system such as a gyroscope.

In addition to imaging salt domes, this system can also be useful in imaging any high angle faults or any other steeply dipping (from horizontal) feature. It is also possible to use such a seismic source-detector assembly which is run into a wellbore on coiled steel tubing in a horizontal well to image horizontally aligned parallel beds above and below the horizontal wellbore.

The concept of doing seismic energy transmission and seismic reception in a single wellbore by instruments inserted therein and carried interiorly to coiled tubing is new. In addition to the mechanical problems associated with building tools to contain both a powerful seismic source and sensitive receivers that can be easily deployed i.e. rolled up on hoist drum, there are other formidable complications as well.

For example, most borehole seismic sources generate strong tube waves that travel in the borehole fluid for the full length of the well with very little attenuation. These tube waves are also reflected from the top and the bottom of the fluid column and therefore reverberations or echoes of them can persist for several seconds. Such tube waves are usually very high in amplitude and can completely mask the reception of any desired horizontally scattered seismic signals. Unsuccessful prior art attempts to perform single well seismic surveying have involved electrically operated seismic sources. Cross coupling of high amplitude electrical signals from the high power electrical drive cables by electromagnetic induction into the seismic detectors can also swamp or mask the low level desired seismic signals from the detectors.

The present invention solves the problems described above by preferably using a borehole airgun which is deployed from the end of a coiled steel tubing. The coiled tubing deployed airgun has been developed for high temperature borehole operation. Cooling water is pumped down through the tubing in the annulus between the electrical cable and the smaller diameter compressed air supply steel tubing run internally therein. The coolant water passes over the airgun and back up the wellbore annulus outside the coiled tubing to the surface. A multi-conductor armored well logging wire line runs inside the coiled tubing providing electrical control signals to the airgun. A second multi-conductor armored wire line also run inside the coiled tubing provides electrical connection to the detectors. Compressed air is provided by a smaller diameter (such as ¼") steel tubing which is also run through the typically 1½" inside diameter coiled steel tubing. An array of seismic detectors (preferably hydrophones) are connected to the cable at spaced intervals inside the 1½" diameter coiled steel tubing above the airgun.

Air released from the airgun upon its activation into the borehole fluid is a very effective tube wave attenuator. Tube waves travelling along the borehole are highly attenuated after travelling only a few tens of feet in the array of released air bubbles. This is clearly illustrated from field data of FIGS. 2 and 3. In FIG. 2 time in milliseconds from source firing is on the horizontal axis and depth is on the vertical axis for 3 different detectors. These data were gathered using a 3 component geophone detector at a depth of 1200 ft in a first well and moving an airgun source in a second parallel wellbore to different shot depths from 600 foot depth to 1800 foot depth firing at 5 ft. intervals. The first of the geophone components is oriented vertically, and is shown in FIG. 2A. The second and third geophone components are oriented horizontally, and at 90° with respect to each other. These are shown in FIG. 2B and FIG. 2C. The strong linear events are caused by downgoing tube waves in the source well. The up-going tube waves in the source well are highly attenuated by the air bubbles above the source. In all 3 illustrations the attenuation of direct arriving tube waves is dramatic as the source (airgun) moves below the detector. FIGS. 3A, B,C shows seismic data recorded with the borehole fluid treated both above and below the source. Both up-going and down-going tube waves are eliminated allowing the weaker but desirable seismic signals to be visible.

Electrical cross-coupling from the airgun control signals is not difficult to control. The only high level electrical signal required in the system of the invention is a 30 millisecond duration pulse to operate the airgun by firing a control solenoid. This signal is carried by a twisted pair of wires inside the armor shielded wireline and does not present any major interference problem especially since it precedes by a significant interval the time window of interest for recording back scattered signals at the spaced detectors.

Vibration isolation between the seismic source at the bottom of the coiled steel tubing and the seismic detectors located higher up inside the coiled steel tubing can be provided if desired.

The present invention may be subject to many modifications and changes without departing from the spirit or actual characteristics thereof. For example, other types of seismic sources could be used if desired. The present embodiment should therefore be considered in all respects as illustrative and not restrictive of the scope of the invention as defined by the appended claims.

I claim:

1. A method for conducting a laterally extensive seismic survey from a well borehole comprising:

suspending a seismic source at the end of a coiled tubing in a well borehole and downhole from a longitudinally spaced array of seismic detectors carried internally in said coiled tubing; and actuating said seismic source to impart a seismic energy impulse which is transmitted substantially normal to the borehole axis and seismic energy reflected and scattered back toward the borehole by adjacent formations and detecting, by said array of seismic detectors, said reflected and scattered seismic energy and recording said detected seismic energy as a function of time whereby air bubbles released at said seismic source move up-hole cause attenuation of any tube wave propagation in the borehole.

2. Apparatus for conducting lateral seismic surveys from a well borehole, comprising:

a plurality of seismic detectors assembled in a longitudinally spaced array carried internally in a coiled tubing and suspended in a well borehole; and a seismic source suspended from the end of said coiled tubing and spaced downhole from said spaced array of detectors, whereby actuation of said seismic source generates both a seismic energy impulse substantially normal to the axis of the borehole which is reflected and scattered from adjacent formations back toward the borehole for detection by said seismic detectors and a plurality of air bubbles which move up-hole substantially attenuate tube wave propagation in the borehole.

3. A system for performing laterally extensive seismic surveys from a well borehole comprising:

an seismic source of seismic energy attached to the end of a coiled tubing and extended into a well borehole thereby;

plural seismic detectors longitudinally spaced from each other and carried interiorly to said coiled tubing in a detector array spaced apart from said seismic source; and control means for causing said seismic source to emit a pulse of seismic energy which is propagated laterally away from the borehole and reflected and scattered back toward the borehole by lateral acoustic impedance discontinuities and detected by said detector array and transmitted to the surface for recording.

4. The system of claim 3 wherein compressed air is supplied from a surface source thereof to an airgun seismic energy source by a second smaller diameter tubing carried within the interior of said coiled tubing.

5. The system of claim 4 wherein electrical signals and power are supplied from surface sources thereof by a plural conductor electrical cable carried within the interior of said coiled tubing.

6. The system of claim 5 wherein cooling water is pumped down said coiled steel tubing to cool said airgun seismic source and vented therefrom to the borehole.

7. A method for conducting seismic surveys at angles normal to the axis of a well borehole comprising the steps of:

suspending on a coiled tubing, and attached to the end thereof, an airgun seismic source into a well borehole;

suspending interiorly to said coiled tubing an array of seismic detectors longitudinally spaced from each other and spaced apart from said seismic source; and activating said airgun seismic source to emit seismic energy impulses substantially at angles normal to the axis of the borehole, which seismic energy is scattered or reflected back toward the borehole by acoustic impedance discontinuities located at angles substantially normal to the borehole axis and which reflected acoustic energy is detected by said array of seismic detectors and transmitted to the surface for recording.

8. The method of claim 7 wherein the steps of activating said airgun seismic source is performed repetitively as said coiled tubing is moved into the borehole.

9. The method of claim 7 wherein the step of activating said airgun seismic source is performed repetitively as said coiled tubing is moved out of the borehole.

10. The method of claim 7 and further including the step of pumping liquid coolant down the interior of said coiled steel tubing to said airgun and venting said coolant into the borehole.

* * * * *